(12) United States Patent  
Duda

(10) Patent No.: US 11,743,097 B2
(45) Date of Patent: Aug. 29, 2023

(54) METHOD AND SYSTEM FOR SHARING STATE BETWEEN NETWORK ELEMENTS

(71) Applicant: Arista Networks, Inc., Santa Clara, CA (US)

(72) Inventor: Kenneth James Duda, Santa Clara, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/363,672

(22) Filed: Jun. 30, 2021

(65) Prior Publication Data

US 2021/0328854 A1   Oct. 21, 2021

Related U.S. Application Data

(63) Continuation of application No. 16/362,608, filed on Mar. 23, 2019, now Pat. No. 11,082,282, which is a
(Continued)

(51) Int. Cl.
| | |
|---|---|
| *H04W 4/00* | (2018.01) |
| *H04L 41/00* | (2022.01) |
| *H04L 45/58* | (2022.01) |
| *H04L 45/02* | (2022.01) |
| *H04L 41/0816* | (2022.01) |
| *H04L 49/00* | (2022.01) |
| *H04L 45/74* | (2022.01) |
| *H04L 49/60* | (2022.01) |

(52) U.S. Cl.
CPC .......... *H04L 41/00* (2013.01); *H04L 41/0816* (2013.01); *H04L 45/02* (2013.01); *H04L 45/58* (2013.01); *H04L 45/74* (2013.01); *H04L 49/3009* (2013.01); *H04L 49/602* (2013.01)

(58) Field of Classification Search
CPC ....................................................... H04L 41/00
See application file for complete search history.

(56) References Cited

U.S. PATENT DOCUMENTS 6,349,091 B1   2/2002   Li
6,930,984 B1 *  8/2005   Nomura .................. H04L 41/00
                                              370/254
(Continued)

OTHER PUBLICATIONS

"Information technology—Telecommunications and information exchange between systems—Intermediate System to Intermediate System intra-domain routeing information exchange protocol for use in conjunction with the protocol for providing the connectionless-mode network service (ISO 8473)"; ISO/IEC 10589:2002(E); 2002.
(Continued)

*Primary Examiner* — Guang W Li
(74) *Attorney, Agent, or Firm* — Fountainhead Law Group P.C.

(57) ABSTRACT

A method for processing state information updates. The method includes receiving, by a coordination point, a plurality of state information from a plurality of network elements; processing at least one of the plurality of state information to generate a result; and applying the result to at least one of the plurality of network elements in order to modify an operation of the at least one of the plurality of network elements.

20 Claims, 7 Drawing Sheets

Related U.S. Application Data continuation of application No. 15/189,488, filed on Jun. 22, 2016, now Pat. No. 10,284,417.

(60) Provisional application No. 62/183,095, filed on Jun. 22, 2015.

(56) References Cited

U.S. PATENT DOCUMENTS

| | | | |
|---|---|---|---|
| 7,177,951 | B1 | 2/2007 | Dykeman et al. |
| 7,281,057 | B2 | 10/2007 | Cain |
| 8,214,447 | B2 | 7/2012 | Deslippe et al. |
| 8,826,032 | B1* | 9/2014 | Yahalom ............ H04L 41/0686 726/2 |
| 8,995,303 | B1 | 3/2015 | Brar et al. |
| 9,042,263 | B1* | 5/2015 | Yahalom ............... H04L 41/142 370/253 |
| 9,253,663 | B2 | 2/2016 | Raleigh et al. |
| 9,491,089 | B2 | 11/2016 | Bhatt et al. |
| 9,584,363 | B1 | 2/2017 | Olson |
| 9,674,193 | B1 | 6/2017 | Madasamy |
| 9,712,390 | B2 | 7/2017 | Lissack |
| 9,760,598 | B1 | 9/2017 | Holenstein et al. |
| 9,984,140 | B1* | 5/2018 | Sukumaran ............ G06F 16/27 |
| 10,218,610 | B2 | 2/2019 | Frost et al. |
| 10,379,890 | B1* | 8/2019 | Mehta ................... G06F 11/301 |
| 10,425,290 | B1* | 9/2019 | Oren ...................... H04L 45/02 |
| 10,469,360 | B1 | 11/2019 | Bhat et al. |
| 10,623,285 | B1 | 4/2020 | Shevade |
| 2001/0019554 | A1* | 9/2001 | Nomura ................. H04L 45/50 370/392 |
| 2002/0075814 | A1* | 6/2002 | Desai ................. H04L 47/2491 370/255 |
| 2004/0143425 | A1 | 7/2004 | Rosenberg |
| 2005/0170852 | A1 | 8/2005 | Li et al. |
| 2005/0265260 | A1 | 12/2005 | Zinin et al. |
| 2007/0088763 | A1* | 4/2007 | Yahalom .............. G06F 16/273 |
| 2007/0124375 | A1 | 5/2007 | Vasudevan et al. |
| 2007/0280102 | A1 | 12/2007 | Vasseur et al. |
| 2009/0144443 | A1 | 6/2009 | Vasseur et al. |
| 2009/0158387 | A1* | 6/2009 | Huang ................... H04L 41/00 726/1 |
| 2009/0245137 | A1 | 10/2009 | Hares et al. |
| 2010/0057563 | A1 | 3/2010 | Rauber et al. |
| 2010/0205392 | A1* | 8/2010 | Schnapp ................ G06F 3/067 711/E12.001 |
| 2010/0296414 | A1 | 11/2010 | Vohra et al. |
| 2011/0103228 | A1 | 5/2011 | Sheth et al. |
| 2011/0116369 | A1 | 5/2011 | Hu et al. |
| 2012/0087304 | A1 | 4/2012 | Porat |
| 2012/0239793 | A1* | 9/2012 | Veerabhadrappa ......................... H04L 41/0213 709/223 |
| 2013/0077621 | A1 | 3/2013 | Jacob Da Silva et al. |
| 2013/0136138 | A1* | 5/2013 | Miller .................. H04L 41/046 370/395.53 |
| 2013/0145461 | A1 | 6/2013 | Barton et al. |
| 2013/0159550 | A1* | 6/2013 | Vasseur ................. H04L 45/021 709/242 |
| 2013/0173876 | A1 | 7/2013 | Namjoshi |
| 2013/0311229 | A1 | 11/2013 | Hadar et al. |
| 2014/0043956 | A1 | 2/2014 | Mirtorabi et al. |
| 2014/0269421 | A1 | 9/2014 | Previdi et al. |
| 2014/0269725 | A1 | 9/2014 | Filsfils et al. |
| 2015/0127789 | A1 | 5/2015 | Lissack |
| 2015/0188760 | A1 | 7/2015 | Anumala et al. |
| 2015/0350314 | A1 | 12/2015 | Miller et al. |
| 2016/0027292 | A1 | 1/2016 | Keming |
| 2016/0094398 | A1 | 3/2016 | Choudhury et al. |
| 2016/0134482 | A1 | 5/2016 | Beshai |
| 2016/0164716 | A1 | 6/2016 | Dusi |
| 2016/0248656 | A1 | 8/2016 | Anand et al. |
| 2016/0248658 | A1 | 8/2016 | Patel et al. |
| 2016/0359872 | A1* | 12/2016 | Yadav .................... H04L 63/20 |
| 2017/0353360 | A1 | 12/2017 | Hayashitani et al. |
| 2018/0041360 | A1 | 2/2018 | Shen et al. |
| 2018/0176082 | A1* | 6/2018 | Katz .................... G06F 16/273 |
| 2018/0176093 | A1 | 6/2018 | Katz et al. |

OTHER PUBLICATIONS

C. Filsfils et al.; "Segment Routing Architecture, draft-ietf-spring-segment-routing-13" Oct. 2017; https://tools ietf.org/id/draft-ietf-spring-segment-routing-13.html.

International Search Report issued in corresponding Application No. PCT/US2019/037815, dated Jul. 26, 2019.

J. Moy; "OSPF Version 2"; STD 54, RFC 2328; DOI 10.17487/RFC2328, Apr. 1998; https://tools.ietf.org/html/rfc2328.

N. Shen et al.; "IS-IS Routing for Spine-Leaf Topology"; Internet Draft, Networking Working Group; Jan. 2, 2018; XP015124979.

R. Coltun et al.; "OSPF for IPv6"; RFC 5340; DOI 10.17487/RFC5340, Jul. 2008; https://tools.ietf.org/html/rfc5340.

T. Li, Arista Networks; "Dynamic Flooding for IS-IS"; Internet Draft, Internet Engineering Task Force; Jan. 7, 2018; XP015125062.

T. Li, Arista Networks; "Dynamic Flooding on Dense Graphs"; Internet Draft, Internet Engineering Task Force; Mar. 26, 2018.

Written Opinion issued in corresponding Application No. PCT/US2019/037815, dated Jul. 26, 2019.

* cited by examiner

METHOD AND SYSTEM FOR SHARING STATE BETWEEN NETWORK ELEMENTS

CROSS-REFERENCE TO RELATED APPLICATIONS

Pursuant to 35 U.S.C. § 120, this application is a continuation application of U.S. patent application Ser. No. 16/362,608, filed on Mar. 23, 2019, entitled "METHOD AND SYSTEM FOR SHARING STATE BETWEEN NETWORK ELEMENTS," now U.S. Pat. No. 11,082,282, which is hereby incorporated by reference in its entirety. Pursuant to 35 U.S.C. § 120, U.S. patent application Ser. No. 16/362,608 is a continuation application of U.S. patent application Ser. No. 15/189,488, filed on Jun. 22, 2016, entitled "METHOD AND SYSTEM FOR SHARING STATE BETWEEN NETWORK ELEMENTS," now U.S. Pat. No. 10,284,417, which is hereby incorporated by reference in its entirety. Pursuant to 35 U.S.C. § 119(e), U.S. patent application Ser. No. 15/189,488 claims benefit of U.S. Provisional Application No. 62/183,095, filed Jun. 22, 2015, entitled "METHOD AND SYSTEM FOR SHARING STATE BETWEEN NETWORK DEVICES." The disclosure of the U.S. Provisional Application is incorporated herein by reference in its entirety.

BACKGROUND

A network element such as, for example, a router or a switch may be configured using a set of states. These states may include, but are not limited to, configuration data of the network element, measurements captured by the network element, hardware, software and/or firmware version information of various components of the network element, routing and/or forwarding information table content, etc. States may be exchanged with other devices in a network, e.g., with other network elements and/or with computing devices.

SUMMARY

In general, in one aspect, the invention relates to a method for processing state information updates. The method includes receiving, by a coordination point, a plurality of state information from a plurality of network elements; processing at least one of the plurality of state information to generate a result; and applying the result to at least one of the plurality of network elements in order to modify an operation of the at least one of the plurality of network elements.

In general, in one aspect, the invention relates to a non-transitory computer readable medium including instructions that enable a coordination point to perform a method. The method includes receiving a plurality of state information from a plurality of network elements; processing at least one of the plurality of state information to generate a result; and applying the result to at least one of the plurality of network elements in order to modify an operation of the at least one of the plurality of network elements.

In general, in one aspect, the invention relates to a system for processing state information updates. The system includes a computing device that includes a computer processor, a coordination point, executing on the computer processor, and a state processing module executing within the coordination point. The state processing module is configured to receive a plurality of state information from a plurality of network elements; process at least one of the plurality of state information to generate a result; and apply the result to at least one of the plurality of network elements in order to modify an operation of the at least one of the plurality of network elements.

DETAILED DESCRIPTION

Figure 1:
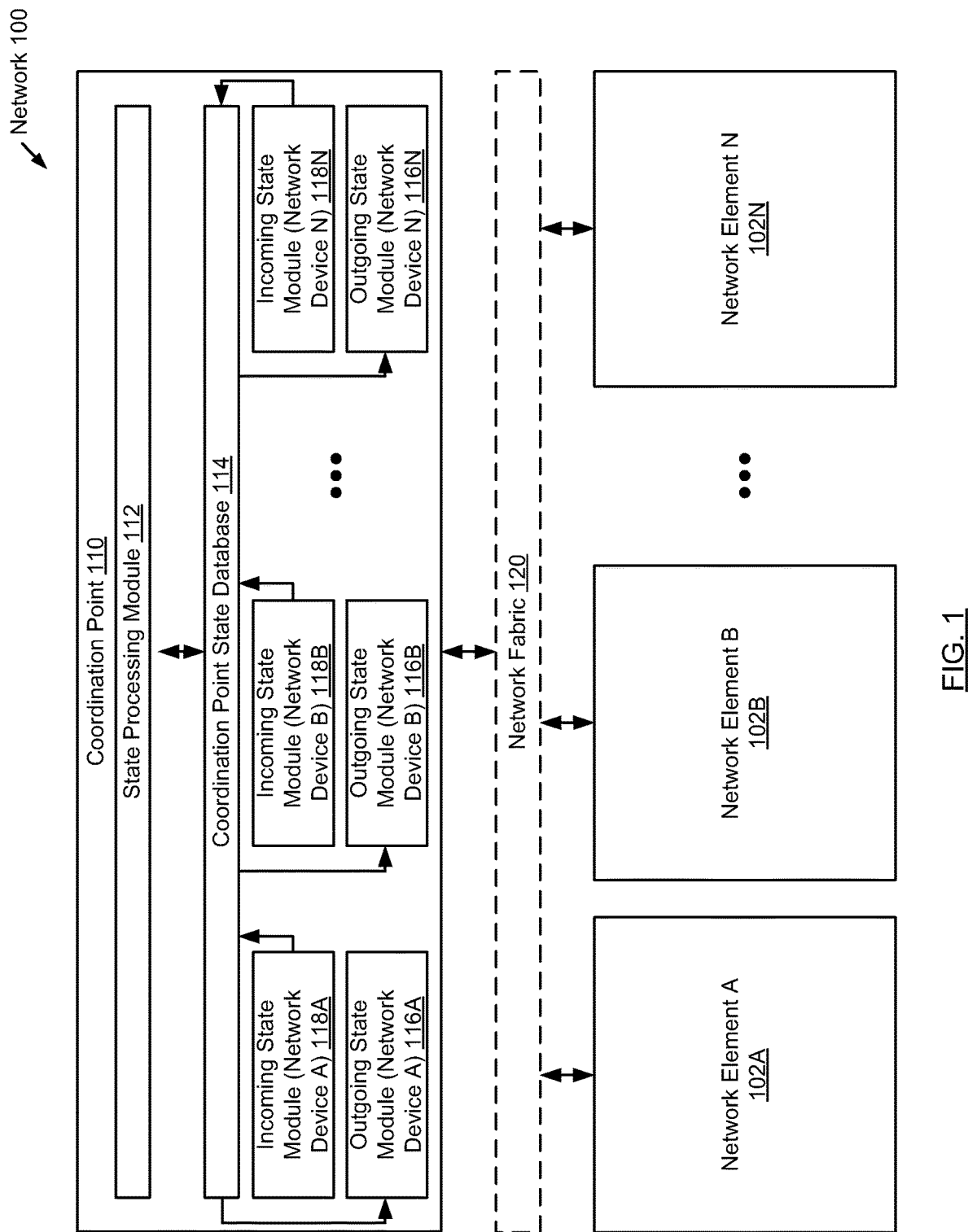
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to sharing state information between network elements using one or more coordination points. More specifically, one or more embodiments of the invention relate to a coordination point(s) that includes functionality to obtain state information from one or more network elements, processing the obtained state information, and then send the processed state information, to the appropriate network elements.

FIG. 1 shows a system in accordance with one or more embodiments of the invention. The system includes a coordination point (110) operatively connected to one or more network elements (102A, 102B, 102N) (see FIG. 2) via a network fabric (120). Each of these components is described below.

In one embodiment of the invention, the coordination point (110) may be implemented on a computing device. In one embodiment of the invention, a computing device is any physical or virtual device that may be used for performing various embodiments of the invention. The computing device may be similar to the computing device shown in FIG. 7. The physical device may correspond to any physical system with functionality to implement one or more embodiments of the invention. For example, the physical device may be a server (i.e., a device with at least a processor(s), memory, and an operating system) that is directly (or operatively) connected to at least one network element (102A, 102B, 102N).

Alternatively, the physical device may be a special purpose computing device that includes an application-specific processor(s)/hardware configured to only execute embodiments of the invention. In such cases, the physical device may implement embodiments of the invention in hardware as a family of circuits and limited functionality to receive input and generate output in accordance with various embodiments of the invention. In addition, such computing devices may use a state-machine to implement various embodiments of the invention.

In another embodiment of the invention, the physical device may correspond to a computing device that includes a general purpose processor(s) and an application-specific processor(s)/hardware. In such cases, one or more portions of the invention may be implemented using the operating system and general purpose processor(s), and one or more portions of the invention may be implemented using the application-specific processor(s)/hardware.

Continuing the discussion of FIG. 1, the coordination point may correspond to a virtual machine. Broadly speaking, a virtual machine is a distinct operating environment configured to inherit underlying functionality of the host operating system (and access to the underlying host hardware) via an abstraction layer. In one or more embodiments of the invention, a virtual machine includes a separate instance of an operating system, which is distinct from the host operating system. For example, one or more embodiments of the invention may be implemented on VMware® architectures involving: (i) one or more virtual machines executing on a host computer system such that each virtual machine serves as host to an instance of a guest operating system; and (ii) a hypervisor layer serving to facilitate intra-host communication between the one or more virtual machines and host computer system hardware. Alternatively, one or more embodiments of the invention may be implemented on Xen® architectures involving: (i) a control host operating system (e.g., Dom 0) including a hypervisor; and (ii) one or more VMs (e.g., Dom U) executing guest operating system instances. The invention is not limited to the aforementioned exemplary architectures. VMware® is a registered trademark of VMware, Inc. Xen® is a trademark overseen by the Xen Project Advisory Board.

In one embodiment of the invention, the coordination point may be implemented in a virtual machine executing on a network element (102A, 102B, 102N). In another embodiment of the invention, the coordination point may be implemented in a virtual machine executing on a server that is operatively (or directly connected) to a network element (e.g., 102A, 102B, 102N).

In one embodiment of the invention, the coordination point (110) includes executable instructions (stored on a non-transitory computer readable medium (not shown)) which when executed enable the coordination point to perform the methods described below.

Continuing with the discussion of FIG. 1, the coordination point includes a coordination point state database (114), a state processing module (112), one or more incoming state modules (118A, 118B, 118N), and one or more outgoing state modules (116A, 116B, 116N). Each of these components is described below.

In one embodiment of the invention, coordination point state database (114) includes a state of each of the network elements for which it is acting as the coordination point. The state of each of the network elements, stored in the coordination point state database, may include, but is not limited to: (i) the state information that has been provided to the coordination point by the network elements (see e.g., FIG. 3) and (ii) the state information obtained from other network elements (or generated by the coordination point or received from another entity connected to the coordination point) that is being sent to (or is scheduled to be sent to) the network element (see e.g., FIG. 4). Accordingly, the state of a network element (as specified in Network Element State Database) and the state of the network element maintained in the coordination point state database (114) may be different. The aforementioned differences may be the result of state changes that have been made on the network element that have not been propagated to the coordination point and/or state changes that are scheduled to be sent to the network element but have not been sent.

In one embodiment of the invention, the coordination point state database (114) may be implemented using any type of database (e.g., a relational database, a distributed database, etc.). Further, the coordination point state database (114) may be implemented in-memory (e.g., the contents of the coordination point state database (114) may be maintained in volatile memory). Alternatively, the coordination point state database (114) may be implemented using persistent storage. In another embodiment of the invention, the coordination point state database (114) is implemented as an in-memory database with a copy of the coordination point state database (114) being stored in persistent storage. In such a case, as changes are made to the in-memory database, copies of the changes (with a timestamp) may be stored in persistent storage. A history of the encountered states may thus be established. The use of an in-memory database may provide faster access to the contents of the coordination point state database (114).

Those skilled in the art will appreciate that while the term database is used above, the coordination point state database (114) may be implemented using any known or later developed data structure(s) to manage and/or organize the content in the coordination point state database (114).

In one embodiment of the invention, the state information of the network element(s) that is stored in the coordination point state database (114) may include, but is not limited to: (i) information about all services currently executing on the network element; (ii) the version of all software executing on the network element; (iii) the version of all firmware on the network element; (iv) all hardware version information for all hardware in the network element; (v) information about the current state of all tables (e.g., routing table, forwarding table, etc.) in the network element that are used to process packets (described below), where the information may include the current entries in each of the tables; and (vi) information about each of the services/protocols/features configured on the network element (e.g., MLAG, LACP, VXLAN, LLDP, Tap Aggregation, Data Center Bridging Capability Exchange, ACL, VLAN, VRRP, VARP, STP, OSPF, BGP, RIP, BDF, MPLS, PIM, ICMP, IGMP, etc.), where this information may include information about the current configuration and status of each of the services/ protocols/features). The coordination point state database (114) may include other information without departing from the invention.

In one embodiment of the invention, the coordination point state database (114) is a distributed database that may span one or more datacenters and for which state synchronization may be available.

Continuing with the discussion of coordination point (110), the state processing module (112) includes functionality to: (i) determine what state information has been received from each of the network elements; (ii) process the received state information; and (iii) determine to which network elements (if any) to send out the processed state information (see e.g., examples discussed below). Additional detail about the functionality of the state processing module (112) is described in FIG. 4. While the state processing module (112) is represented as a single module, the state processing module (112) may be implemented as a set of state processing modules where each of these state processing modules includes functionality to process certain types of state information. For example, there may be one state processing module that manages the coordination of all state information related to VXLAN and there may be another state processing module that handles all state information related to the Border Gateway Protocol (BGP). These examples are not intended to limit the scope of the invention.

In one embodiment of the invention, the state information received from each of the network elements (102A, 102B, 102N) is received via a network element-specific incoming state module (118A, 118B, 118N). The incoming state module may implemented as a data structure that is specific to the network element (e.g., there is one instance of the data structure for each network element). In another embodiment of the invention, there may be a single incoming state module that receives the state information from all network elements (102A, 102B, 102N). Regardless of the implementation, one example of a data structure that may be used is a FIFO queue. Other data structures may be used without departing from the invention.

In one embodiment of the invention, the state information to be sent to specific network elements (102A, 102B, 102N) may be stored in a network element-specific outgoing state module (116A, 116B, 116N). The outgoing state module may be implemented as a data structure that is specific to the network element (e.g., there is one instance of the data structure for each network element). In another embodiment of the invention, there may be a single outgoing state module that temporarily stores outgoing state information for all network elements (102A, 102B, 102N). Regardless of the implementation, one example of a data structure that may be used is a FIFO queue. Other data structures may be used without departing from the invention.

In one embodiment of the invention, the state information from the individual network elements is shared with the coordination point using an asynchronous replication mechanism. More specifically, when state information is changed in the network element, the changed state information is first stored in the network element state database (FIG. 2, 204) and then a copy of the changed state information is transmitted to the coordination point.

In one embodiment of the invention, the state information in the coordination point is shared with the individual network elements using an asynchronous replication mechanism. More specifically, when state information is changed in the coordination point, the changed state information is first stored in the coordination point state database (FIG. 1, 114) and then a copy of the changed state information is transmitted to the individual network elements.

In one embodiment of the invention, a network fabric (120) provides a communication medium that enables the network elements and the coordination point to share state information.

The network elements A-N(102A-102N) and the coordination point (110) may communicate via the network fabric (120). The network fabric (120) may include any combination of local and wide area (e.g., Internet) network segments that may be wire-based and/or wireless and that may use any combination of wired and/or wireless communication protocols. The manner in which the network elements and the coordination point communicate may vary, based on the implementation of the invention.

For example, consider a scenario in which the coordination point is executing on a server that is directly connected to network element A (102A). In this scenario, the network fabric from the perspective of network element A is a physical connection (i.e., a direct wired connection), while the network fabric from the perspective of network element B and network element C may include one or more other network elements (not shown) that provide connectivity to network element A that, in turn, provides connectivity to the server upon which the connection point is executing.

In another example, consider a scenario in which the coordination point is executing in a virtual machine executing on network element A (102A). In this scenario, the network fabric from the perspective of network element A is a software mechanism that allows network element A to communicate with the virtual machine, while the network fabric from the perspective of network element B and network element C may include one or more other network elements (not shown) that provide connectivity to network element A that, in turn, provides connectivity (via a software mechanism) to the connection point.

In another example, consider a scenario in which the coordination point is executing on a server that is not directly connected to any of the network elements (102A, 102B, 102N). In this scenario, the network fabric may include a set of intermediate network elements (and/or networks) that enable the network elements (102A, 102B, 102N) to send state information to and receive state information from the coordination point.

The invention is not limited to the system shown in FIG. 1. More specifically, while the system shown in FIG. 1 includes a single coordination point, embodiments of the invention may be implemented using multiple coordination points, where the multiple coordination points are configured such that if one of the multiple coordination points fails the other coordination points may continue to operate and provide the functionality described below (see e.g., FIG. 4) to the network elements.

Figure 2:
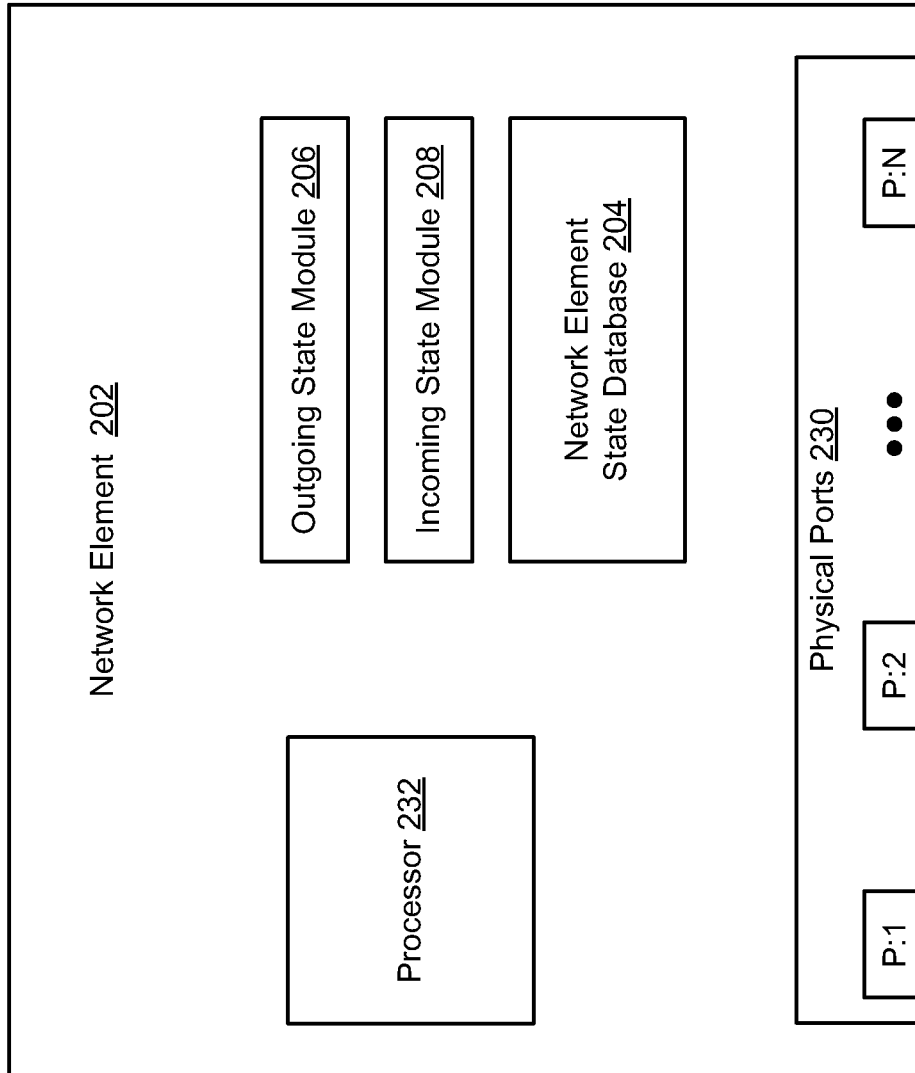
FIG. 2 shows a network element in accordance with one or more embodiments of the invention.

FIG. 2 shows a network element in accordance with one or more embodiments of the invention. In one embodiment of the invention, a network element (202) is a physical device that includes persistent storage, memory (e.g., Random Access Memory), one or more processors (232) (including, e.g., a switch chip), and two or more physical ports (230). In one or more embodiments of the invention, the switch chip is hardware that determines which egress port on a switch to forward media access control (MAC) frames. The switch chip may include egress and ingress ports that may connect to ports on the switch. Each port may or may not be connected to another device on a network (e.g., a server, a switch, a router, etc.). The network element may be configured to receive packets via the ports and determine whether to (i) drop the packet, (ii) process the packet in accordance with one or more embodiments of the invention, and/or (iii) send the packet, based on the processing, out another port on the network element.

How the network element makes the determination of whether to drop the packet, and/or send the packet to another device on the network depends, in part, on whether the network element is a layer-2 (L2) switch or a layer-3 (L3) switch (also referred to as a multi-layer switch), which may perform at least some functions of a router. If the network element is operating as a L2 switch, the network element uses the destination bridging address (e.g., a MAC address) along with a forwarding table to determine which port to use for sending the packet. If the network element is operating as a L3 switch, the network element uses the destination routing address (e.g., an IP address) along with a routing table to determine which port to use for sending the packet, and includes the ability to write the bridging address of the next device to receive the packet in place of its own bridging address (which the last device to send the packet wrote) in the L2 information encapsulating the packet. If the network element is a multi-layer switch, the multi-layer switch includes functionality to process packets using both bridging addresses and routing addresses.

Figure 3:
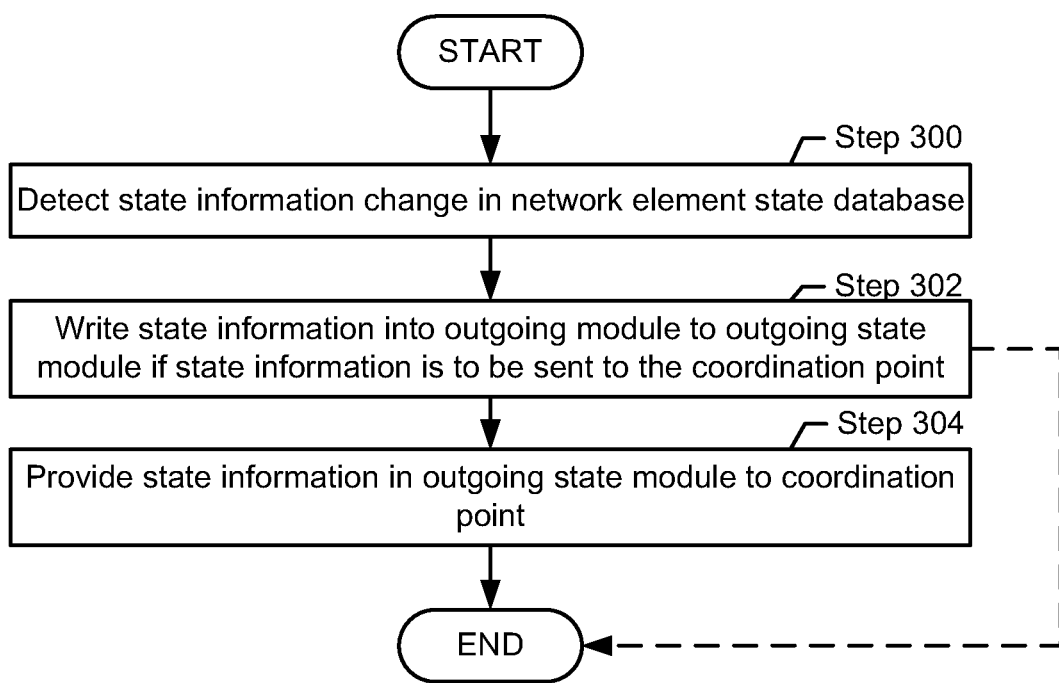
FIG. 3 shows a flowchart for sending state updates from a network element to a coordination point in accordance with one or more embodiments of the invention.
Figure 5:
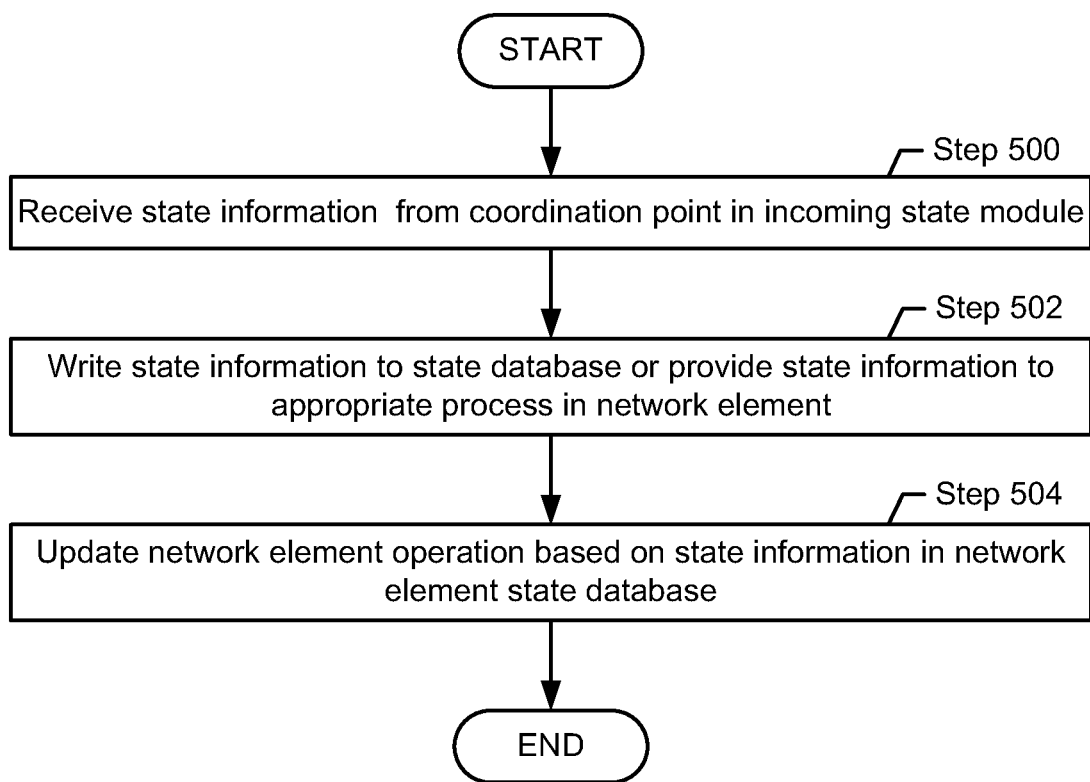
FIG. 5 shows a flowchart for receiving and processing state updates received from a coordination point in accordance with one or more embodiments of the invention.

In one embodiment of the invention, the persistent storage in the network element may include any type of non-transitory computer readable medium that includes instructions, which, when executed by one or more processors in the network element, enable the network to perform the functions described in accordance with one or more embodiments of the invention (see e.g., FIGS. 3 and 5).

In one embodiment of the invention, the functionality of the network element may be logically divided into a control plane and data plane (not shown). The data plane includes functionality to receive packets (denoted as ingress packets) via ports (230), process the packets (as described above) and, as appropriate, transmit packets (denoted as egress packets) via the ports towards a destination.

In one embodiment of the invention, the control plane includes functionality to manage the overall operation of the network element. More specifically, the control plane includes functionality to manage the operation of data plane. The control plane may also include functionality to gather and send state information to the coordination point (see FIG. 3). In addition, the control plane may also include functionality to receive state information from the coordination point and process the received state information (see e.g., FIG. 5).

Examples of network elements include, but are not limited to, a router, a switch, and a multi-layer switch. The network element is not limited to the aforementioned specific examples.

In one embodiment of the invention, the network element state database (204) includes the current state of the network element. The state information that is stored in the network element state database (204) may include, but is not limited to: (i) information about all services currently executing on the network element; (ii) the version of all software executing on the network element; (iii) the version of all firmware on the network element; (iv) all hardware version information for all hardware in the network element; (v) information about the current state of all tables (e.g., routing table, forwarding table, etc.) in the network element that are used to process packets (described below), where the information may include the current entries in each of the tables; and (vi) information about each of the services/protocols/features configured on the network element (e.g., MLAG, LACP, VXLAN, LLDP, Tap Aggregation, Data Center Bridging Capability Exchange, ACL, VLAN, VRRP, VARP, STP, OSPF, BGP, RIP, BDF, MPLS, PIM, ICMP, IGMP, etc.), where this information may include information about the current configuration and status of each of the services/protocols/features). The network element state database (204) may include other information without departing from the invention.

In one embodiment of the invention, the network element state database (204) may be implemented using any type of database (e.g., a relational database, a distributed database, etc.) Further, the network element state database (204) may be implemented in-memory (i.e., the contents of the network element state database (204) may be maintained in volatile memory). Alternatively, the network element state database (204) may be implemented using persistent storage. In another embodiment of the invention, the network element state database (204) is implemented as an in-memory database with a copy of the network element state database (204) being stored in persistent storage. In such cases, as changes are made to the in-memory database, copies of the changes (with a timestamp) may be stored in persistent storage. The use of an in-memory database may provide faster access to the contents of the network element state database (204).

Those skilled in the art will appreciate that while the term database is used above, the network element state database (204) may be implemented using any known or later developed data structure(s) to manage and/or organize the content in the network element state database (204).

In one embodiment of the invention, the network element state database (204) may be updated by the network element (or by a process executing thereon). The updates may be generated internally by the network element (or by a process executing thereon) or by state information received from the coordination point (114) (see e.g., FIG. 5). In one embodiment of the invention, the outgoing state module (206) includes a process that monitors the network element state database (204) and identifies updated state information that needs to be sent to the coordination point (see FIG. 3). If the updated state information is to be sent to the coordination point, then the outgoing state module (206) includes functionality to transmit (or otherwise provide) the updated state information to the coordination point.

In one embodiment of the invention, the incoming state module (208) includes a process executing on the network element that includes functionality to receive state information from the coordination point and then process the received state information in accordance the method described in FIG. 5 below.

In one embodiment of the invention, when a network element initially establishes a connection (or session) with the coordination point, the network element may provide the coordination point with all (or a portion) of the state information maintained in the network element state database (204). The coordination point includes functionality to receive this information. The received information is then used as part of the processing in FIG. 4 (described below).

One skilled in the art will recognize that the architecture of a network element, the coordination point and of the network is not limited to the components shown in FIGS. 1-2. For example, the network may include any number and any type of network elements participating in the sharing of states. Further the network elements and the coordination point may include components not shown in FIGS. 1 and 2, e.g., network chips, fabric, line cards, etc. In addition, the coordination point may support an arbitrary number of network elements participating in the sharing of states, and the coordination point may further support different types of state processors resulting in different state sharing behaviors and/or the coordination point may support multiple state processors executing simultaneously, as further described in detail below.

FIG. 3 shows a method for sending state updates from a network element to a coordination point in accordance with one or more embodiments of the invention.

In Step 300, outgoing state module (e.g., 206 in FIG. 2) (or another process executing on the network element) detects a change in the state information in the network element state database. The change may correspond to a change in any value in the network element state database. Examples of changes in the state information may include, but are not limited to, a new entry is added to a forwarding table, an entry is deleted from a forwarding table, a new protocol is being implemented on the network element, and the status of a service on the network element has changed (e.g., from active to inactive).

In Step 302, the network element writes the detected changed state information to the outgoing state module of the network element. The writing of the detected changed state information may be event-triggered, e.g., the network element may write the detected changed state information to the outgoing state module once the detection occurs in Step 300. In one embodiment of the invention, the state information written to the outgoing state module includes a timestamp, which may be used in the processing described in FIG. 4.

In Step 304, the network element sends the state information in the outgoing state module of the network element to the coordination point. The sending of the state information may be event-triggered, e.g., the network element may send the state information to the coordination point once the state has been written to the outgoing state module in Step 302. Alternatively, the state information may be queued in the outgoing state module and then sent when a threshold amount of state information is stored in the outgoing state module. The network element may use any type of communication protocol in order to transmit the state information to the coordination point, including, for example link layer, internet layer, transport layer, and application layer protocols that may further include proprietary protocols specifically designed for the sharing of configuration information. After having sent the state information to the coordination point, the network element may delete the state information from the outgoing state module.

Figure 4:
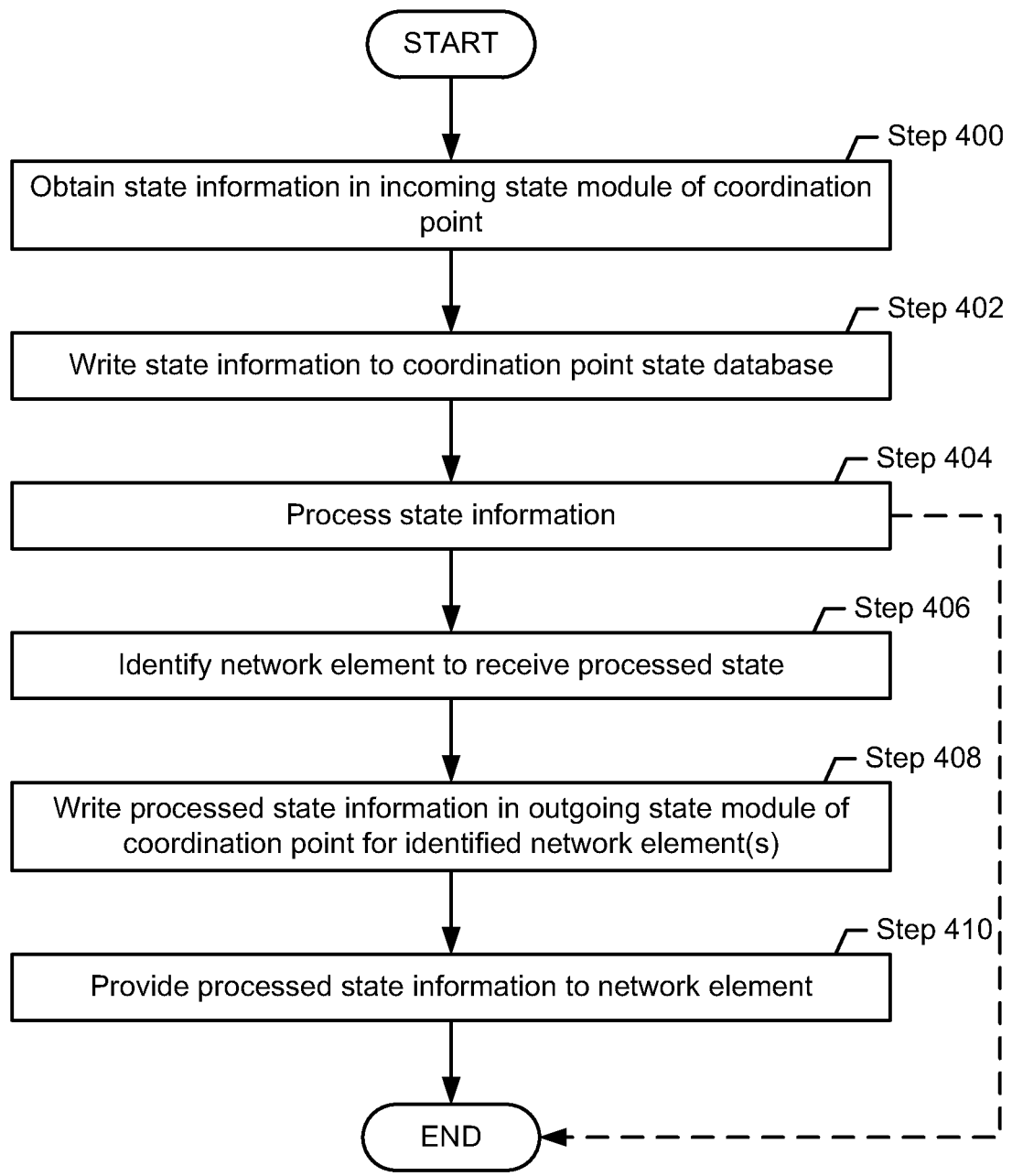
FIG. 4 shows a flowchart for processing state updates by a coordination point in accordance with one or more embodiments of the invention.

FIG. 4 shows a method for processing state information updates received by a coordination point in accordance with one or more embodiments of the invention.

Turning to FIG. 4, in Step 400 the coordination point receives state information from a network element participating in the sharing of state information (e.g., from a network element that performed the method shown in FIG. 3). In one or more embodiments of the invention, the coordination point stores the state information in the incoming state module corresponding to the network element that sent the state information. The receipt of state information triggers the subsequent execution of Steps 402-410.

In Step 402, the coordination point writes the state information received in the incoming state module to the coordination point state database. In one embodiment of the invention, the state information in the incoming state module may be used to update an already existing state information value in the coordination point state database. Alternatively, in one embodiment of the invention, the state information in the incoming state module may be new state information, i.e., state information not yet existing in the coordination point state database. In this case, the received state information may be added to the coordination point state database as new state information. The state information may subsequently be deleted from the incoming state module.

In Step 404, the state processor, e.g., in response to receiving state information, may process the state information. The processing may include obtaining the updated state information (i.e., the updated state information received in Step 400) along with other state information that is currently stored in the coordination point state database. The processing may further include, but is not limited to, any combination of the following: (i) generating new state information based on the obtained state information; (ii) modifying all or a portion of the obtained state information; (iii) filtering the state information to obtain a subset of the state information; (iv) aggregating the state information to generate a new set of state information; and (v) applying one or more policies to the state information where the policies are used, at least in part, to determine how to process the obtained state information.

In one embodiment of the invention, the processing of the state information may include resolving a conflict that exists between two pieces of state information. For example, consider a scenario in which state information 1 (with timestamp=T1) includes a first VTEP-MAC address mapping listing VTEP 1-MAC address 1 and a state information 2 (with timestamp=T2) includes a second VTEP-MAC address mapping listing VTEP 1-MAC address 2. In this example, the state processing module includes a policy that specifies that the VTEP-MAC address mapping that includes the later timestamp is to be used when there is conflicting state information. Accordingly, in this example, state information 2 is selected to be used to generate the new state information as it has a newer timestamp than state information 2.

In one embodiment of the invention, the resulting of processing of the state information in Step 404 is written to the coordination point state database.

In Step 406, in response to writing the results of the processing to the state database (i.e., written new state information or modified state information to the coordination point state database), the coordination point identifies zero, one or more recipient network element(s) of the new (or modified) state information. In one or more embodiments of the invention the recipient network elements are scenario specific and are determined by the configuration of the state processor. Consider, for example the scenario where the state information sharing is used for the dissemination of configuration parameters. In this scenario, the coordination point may disseminate the updated configuration parameters to all network elements participating in the sharing of state information. In contrast, consider another scenario where the state information sharing is used to share MAC addresses of elements of a VLAN with other network elements. In this scenario, the state information representing these MAC addresses would only be shared with network elements that serve the VLAN, but not with other network elements. In one embodiment of the invention, the state information may not be distributed to the network element from where the state information was received in Step 400, and the network element from where the state information was received may therefore not be identified as a recipient network element.

In Step 408, the coordination point writes the state information generated by the processing in step 404 to the outgoing state module of the coordination point. In one or more embodiments of the invention, the state information may be written to multiple outgoing state modules in cases where multiple network elements are intended recipients of the state information.

In Step 410, the coordination point sends the state information in the outgoing coordination point module(s) to the network element(s). The coordination point may use any type of communication protocol in order to transmit the state information to the network element, including, for example link layer, internet layer, transport layer, and application layer protocols that may further include proprietary protocols specifically designed for the sharing of configuration information. Subsequently, the state information may be deleted from the outgoing coordination point module.

FIG. 5 shows a flowchart for receiving and processing state information updates received from a coordination point in accordance with one or more embodiments of the invention.

Turning to FIG. 5, in Step 500, the network element receives state information from the coordination point. The received state information is stored in the incoming state module of the network elements. In one or more embodiments of the invention, the receipt of state information by the network element triggers the subsequent execution of steps 502 and 504.

In Step 502, the network element writes the state information in the incoming state module to the state database of the network element. Subsequently the network element may delete the state information in the incoming state module.

In Step 504, the network element updates its operation (e.g., the manner in which packets are processed, the protocols being implemented on the network element, the manner in which protocols are being implemented on the network element, etc.), based on the state information in the state database.

The following section describes various examples in accordance with one or more embodiments of the invention. The examples are not intended to limit the scope of the invention.

Example Use Case 1

Figure 6:
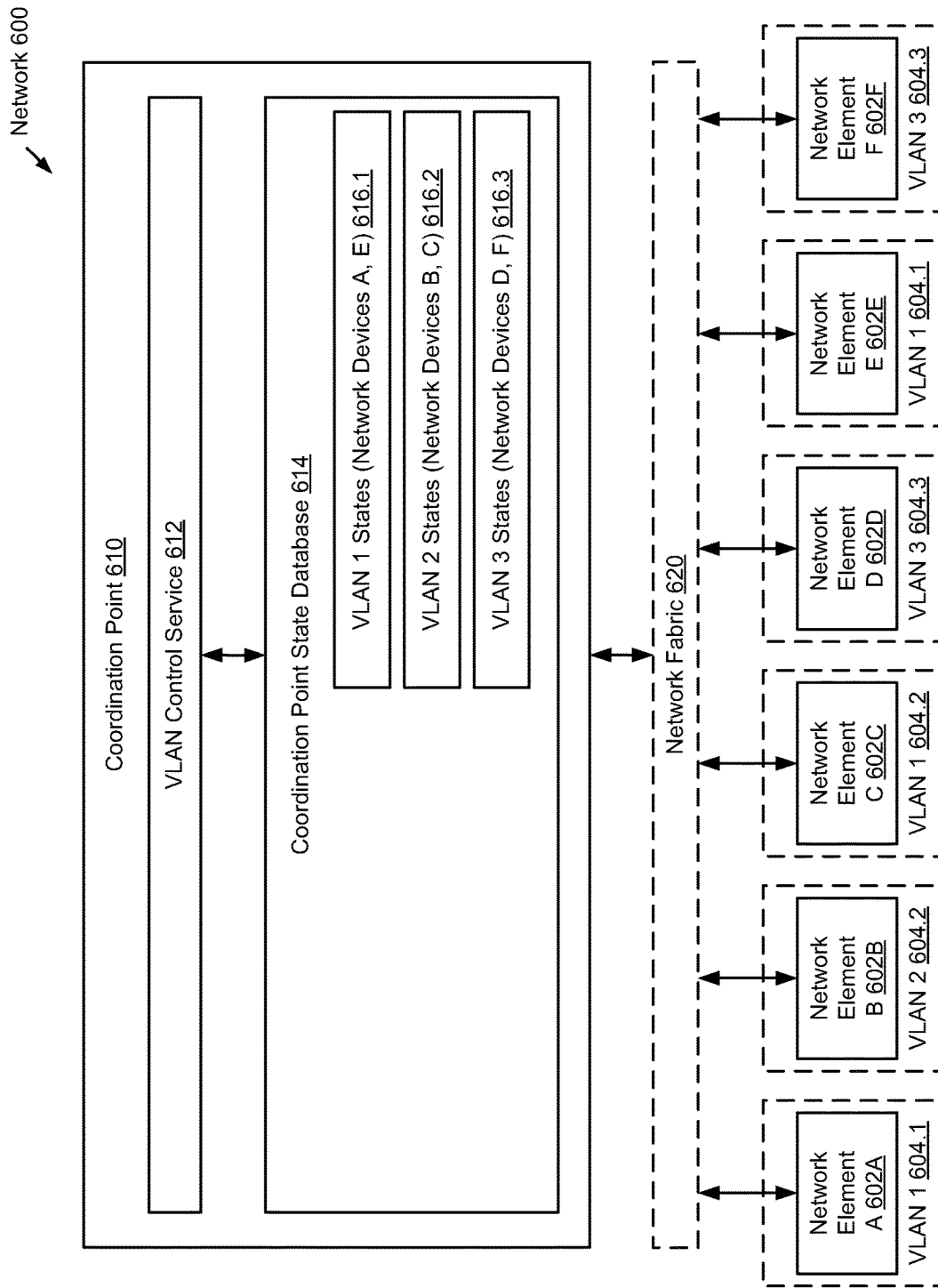
FIG. 6 shows an example in accordance with one or more embodiments of the invention.

FIG. 6 shows an example in accordance with one or more embodiments of the invention. The example is not intended to limit the scope of the invention.

As shown in FIG. 6, the coordination point (610) is implementing a VLAN control service (612) (where this is one instance of the state processing module). The VLAN control service includes functionality to process state information associated with VLAN in accordance with FIG. 4 above.

More specifically, in this example, each of the network elements (602A-602F) sends, e.g., in accordance with FIG. 3, state information related to its VLAN implementation. The coordination point is configured to receive the aforementioned state information from each of network elements and aggregate the state information on a per-VLAN basis. For example, all the state information related to VLAN 1 is aggregated in single location (616.1) in the coordination point state database. Similar aggregations are provided for VLANS 2 and 3 (616.2 and 616.3, respectively). Further, as the aggregated VLAN state information changes, the state information from the coordination point state database (614) is sent to the appropriate network elements.

For example, when the VLAN 1 state information (616.1) changes in the coordination point state database, the network elements (i.e., 602A, 602E) associated with VLAN 1 are identified and the appropriate state information changes are sent these network elements. The updates to the state information are not sent to other network elements that are not part of VLAN 1.

Example Use Case 2

Consider a scenario in which a topology service is employed in order to track and administer the network elements in a network. The topology service monitors the types of network elements in the network, their configuration, the ports being used to interconnect the network elements, etc. The topology service further detects failures and generates alerts if an abnormal operating condition of a network element is detected. The topology service is executing on the coordination point. If the connectivity of a network element changes, for example, because the system administrator disconnects one of the physical ports of the network element, the network element communicates this connectivity change to the topology service. The topology service disseminates the updated network element port information to other network elements, thereby ensuring that the other network elements do not attempt to communicate with the network element via the disconnected port.

Example Use Case 3

Consider a scenario in which an alert data base is employed to centrally maintain a record of known bugs that may affect network elements. The alert data base is populated with bug information, for example, by the manufacturer of the network elements or by an independent entity, such as a network administrator, etc. The coordination point downloads the bug information from the alert data base, for example, periodically or event-triggered when a bug is added to the alert data base. The coordination point then assesses, based on the configuration information of the network elements and based on a set of rules, if and how the network elements are affected by the bug. A particular bug may for example only affect a particular software version, a particular hardware platform, or a particular combination of software version and hardware platform of a network element. If the coordination point determines that a network element is affected by the bug, the coordination point takes bug remediating action, for example, by reconfiguring the network element, by disabling compromised features, and/or by providing a software patch.

Example Use Case 4

Consider a scenario in which a new data center is established, or in which routers and switches in an existing data center are replaced. The network devices to be installed support zero touch provisioning, i.e., they may be deployed in the data center without requiring any human intervention. The use of the coordination point enables the zero touch provisioning on a network-wide level. Rather than having to configure individual routers and switches, a network administrator may establish a high-level logical network design map that specifies, for example, a leaf-spine topology to be used in the data center. The configuration of the individual routers and switches may then be derived from this logical network design map, and may be provided to the routers and switches as states, via the coordination point. Later, the coordination point may be relied upon to monitor and service the routers and switches in the data center, as subsequently described in use case 5.

Example Use Case 5

Consider a scenario in which maintenance is performed on a large number of routers and switches in a data center. Prior to performing the maintenance, the network administrator may execute scripts that capture the status of the routers and switches. After completion of the maintenance, the scripts may be re-executed to again capture the status of the routers and switches. A comparison of the pre and post status of the routers and switches may enable the network administrator to assess whether the maintenance had the desired effect. The coordination point, in the use case, is relied upon to centrally capture the states of the routers and switches, required to assess the status before and after the maintenance. Thus, there is no need for manually querying potentially many routers and switches.

Further, the coordination point may also be used to reconfigure routers and switches when switching between a production mode and a maintenance mode. While the production mode may be used during regular operation of the network, the maintenance mode may be used while maintenance is performed. In maintenance mode, the network may still provide all or at least some functionalities, although, for example, with a limited bandwidth. The maintenance mode may, for example, reconfigure the network such that certain routers and/or switches are bypassed, thus allowing maintenance to be performed on these components.

Further, assume that a maintenance operation did not have the desired effect. In this case, the coordination point may be used to perform a rollback operation, thereby undoing the unsuccessful maintenance operation. The rollback operation may target specific switches or routers, or it may target all network elements in a single rollback operation. Because a history of states was established in the coordination point state database, the rollback operation may aim for the restoration of a particular state at a particular point in time, as desired by the network administrator.

Example Use Case 6

Consider a scenario in which issues, e.g., performance bottlenecks, errors or outages, occur. The coordination point, in this scenario, may obtain the relevant states from the relevant network elements to enable the network administrator to diagnose an underlying cause. The obtained states may be summarized in a report that may be human-readable. The report may also consider virtual devices.

Embodiments of the invention may enable the efficient operation of a network that includes multiple/many network elements. A system in accordance with one or more embodiments of the invention enables the exchange of states (such as, for example, configuration, topology, counters, etc.) between network devices, as needed. The exchange is performed via a coordination point that acts as a broker by determining which states, of the states that have been received from a network element, are to be provided to other network elements.

The system, in accordance with an embodiment of the invention, is scalable to be used in conjunction with networks of any size and enables network automation, thereby reducing cost and/or increasing reliability and performance.

In one embodiment of the invention, the use of the coordination point enables a holistic view of the whole network from one or more central points, thus enabling single-touch point provisioning, monitoring and management of the network elements. Accordingly, the system, in accordance with an embodiment of the invention, obviates the need for element-by-element provisioning, and management of network elements and may provide full visibility of all aspects of the network at all times.

Figure 7:
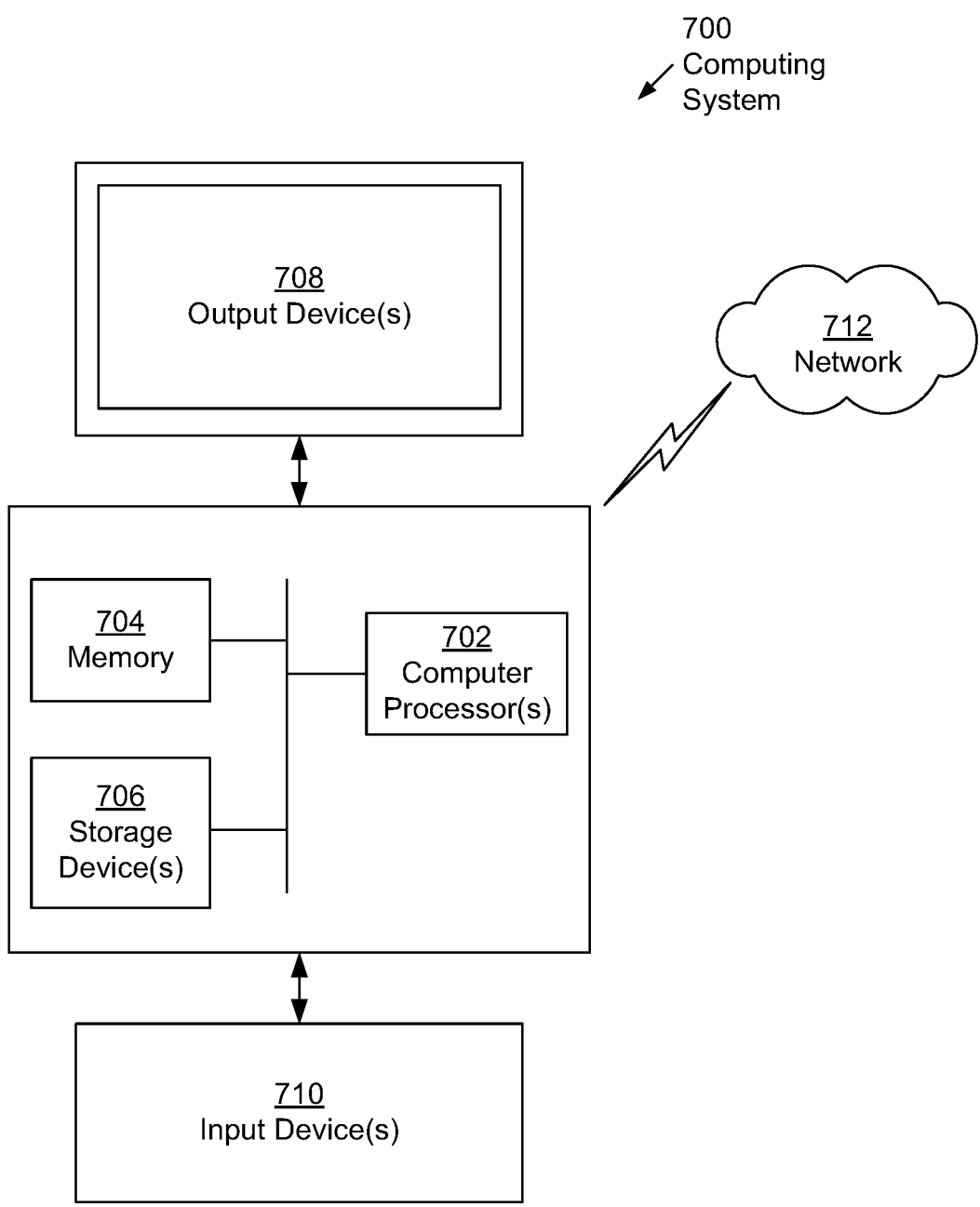
FIG. 7 shows a computing system in accordance with one or more embodiments of the invention.

Embodiments of the technology may be implemented on a computing system. Any combination of mobile, desktop, server, embedded, or other types of hardware may be used. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (712) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the technology.

Further, one or more elements of the aforementioned computing system (700) may be located at a remote location and connected to the other elements over a network (712). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing state information updates using zero touch provisioning, the method comprising:
   using a coordination point to enable zero touch provisioning by:
      obtaining, by the coordination point, a network design map comprising state information for a plurality of network elements, said network design map comprising a leaf-spine topology;
      processing, by the coordination point, the state information of the network design map to obtain processed state information;
      identifying, by the coordination point and using the processed state information, a network element of the plurality of network elements to receive the processed state information;
      transmitting the processed state information to the identified network element, said identified network element comprising an incoming state module for receiving the processed state information; and
      monitoring the plurality of network elements using the network design map to determine when a change in state information of at least one network element of the plurality of network elements has occurred,
      wherein the state information comprises at least one of: configuration data of a network element of the plurality of network elements, measurements stored by a network element of the plurality of network elements, version information associated with components of a network element of the plurality of network elements, and routing and/or forwarding information associated with a network element of the plurality of network elements.

2. The method of claim 1, further comprising, before transmitting the processed state information:
   writing the processed state information in an outgoing state module of the coordination point.

3. The method of claim 2, wherein the outgoing state module of the coordination point is associated with the identified network element.

4. The method of claim 1, wherein the processed state information comprises configuration information for the identified network element.

5. The method of claim 1, wherein transmitting the processed state information to the identified network element comprises using an asynchronous replication mechanism.

6. The method of claim 1, wherein the network design map comprises configuration information associated with the plurality of network elements.

7. The method of claim 1, wherein said identified network element of the plurality of network elements further comprises a network element state database, wherein the processed state information received by the incoming state module of the identified network element is stored in the network element state database.

8. The method of claim 7, wherein said identified network element of the plurality of network elements further comprises an outgoing state module, wherein the outgoing state module of the identified network element monitors the network element state database for changes to be sent to the coordination point.

9. A method for processing state information updates comprising:
   receiving, by a coordination point, a first plurality of state information from a plurality of network elements,
   wherein the first plurality of state information comprises at least one of: configuration data of a network element of the plurality of network elements, measurements stored by a network element of the plurality of network elements, version information associated with components of a network element of the plurality of network elements, and routing and/or forwarding information associated with a network element of the plurality of network elements;
   writing, by the coordination point, the first plurality of state information to a coordination point state database to obtain a first state history instance;
   performing maintenance on a first network element of the plurality of network elements, the maintenance comprising changing the state information of the first network element;
   receiving, by the coordination point, a second plurality of state information from the plurality of network elements, wherein the second plurality of state information comprises post-maintenance state information of the first network element;
   processing, by the coordination point, the post-maintenance state information to determine a status of the plurality of network elements after performing the maintenance; and
   reconfiguring, by the coordination point and before performing the maintenance, at least one of the plurality of network elements to a maintenance mode.

10. The method of claim 9, wherein the status indicates that performing the maintenance did not have a first effect.

11. The method of claim 10, further comprising:
    performing, by the coordination point and based on the performed maintenance not having the first effect, a rollback operation using the first state history instance.

12. The method of claim 11, wherein the rollback operation targets at least one of the plurality of network elements.

13. The method of claim 9, further comprising:
    reconfiguring, by the coordination point and after performing the maintenance, at least one of the plurality of network elements to a production mode.

14. The method of claim 9, wherein, while at least one of the plurality of network elements is in the maintenance mode, other network elements of the plurality of network elements perform network functionality.

15. A non-transitory computer readable medium comprising computer readable program code, which when executed by a computer processor enables the computer processor to perform a method for managing network elements, the method comprising:
    obtaining, by a coordination point, a network design map comprising state information for a plurality of network elements;
    identifying, by the coordination point and using the network design map, a network element of the plurality of network elements to receive configuration information;
    transmitting, by the coordination point, the configuration information to the identified network element;
    receiving, by the coordination point, a first plurality of state information from the plurality of network elements, wherein the first plurality of state information represents a state history instance;
    making a determination, using a second plurality of state information received at the coordination point from the plurality of network elements, of a status of the identified network element after a maintenance event, wherein the maintenance event changes the state information of at least one of the plurality of network elements; and reconfiguring, by the coordination point and before the maintenance event, the identified network element to transition to a maintenance mode.

16. The non-transitory computer readable medium of claim 15, wherein transmitting the configuration information to the identified network element comprises using an asynchronous replication mechanism.

17. The non-transitory computer readable medium of claim 15, wherein the first plurality of state information comprises configuration information associated with the plurality of network elements.

18. The non-transitory computer readable medium of claim 15, wherein the status indicates that the maintenance event did not have a first effect on the identified network element.

19. The non-transitory computer readable medium of claim 18, wherein the method performed by executing the computer readable program code further comprises:

performing, by the coordination point and based on the maintenance event not having the first effect, a rollback operation using the state history instance.

20. The non-transitory computer readable medium of claim 15, wherein the state information comprises at least one of: configuration data of a network element of the plurality of network elements, measurements stored by a network element of the plurality of network elements, version information associated with components of a network element of the plurality of network elements, and routing and/or forwarding information associated with a network element of the plurality of network elements.

* * * * *